March 17, 1936. J. F. WAIT 2,034,068
PROCESS OF TREATING HYDROCARBONS
Filed July 30, 1932
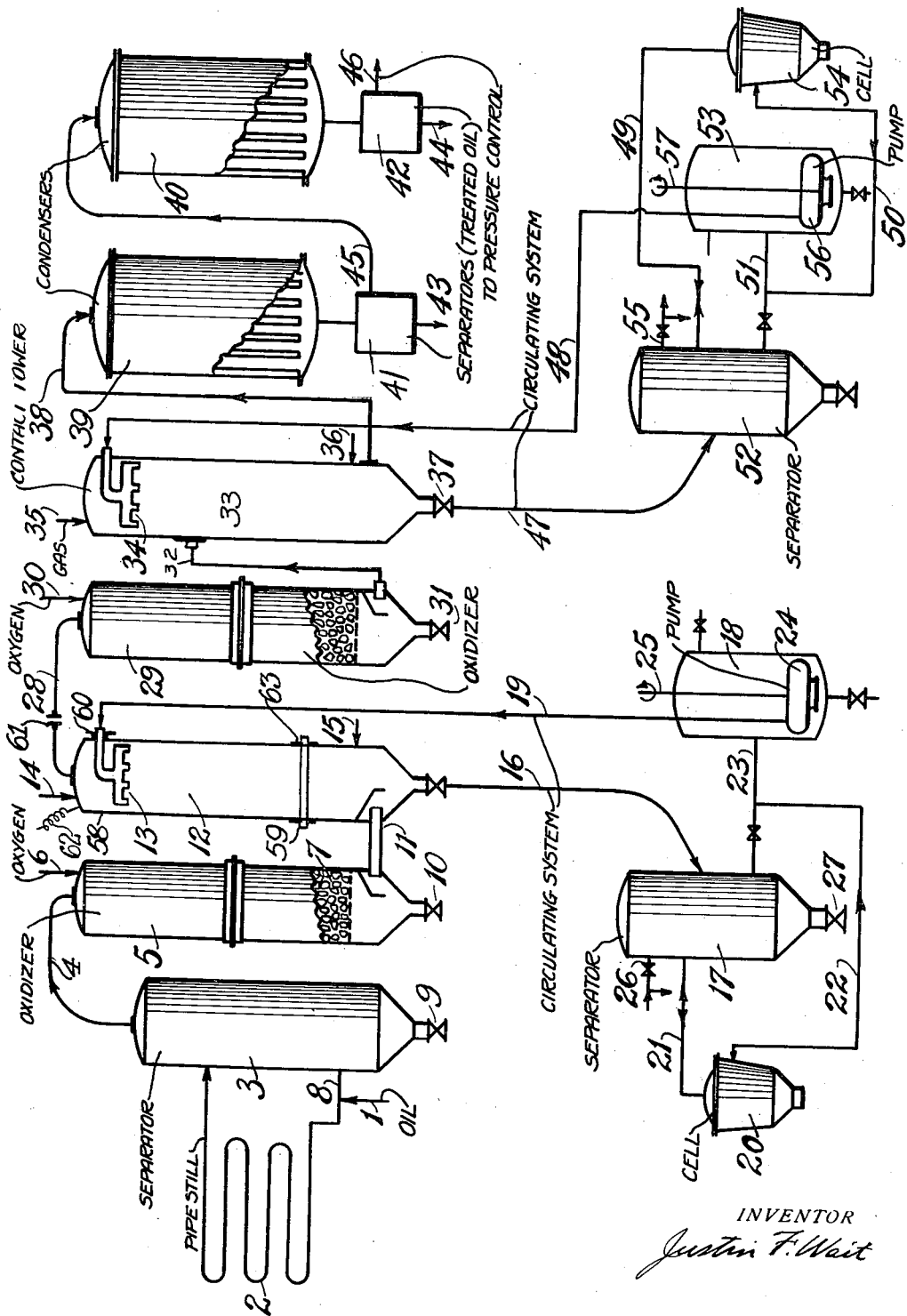
INVENTOR
Justin F. Wait Patented Mar. 17, 1936

2,034,068

UNITED STATES PATENT OFFICE 2,034,068

PROCESS OF TREATING HYDROCARBONS

Justin F. Wait, New York, N. Y.

Application July 30, 1932, Serial No. 627,170

8 Claims. (Cl. 196—78)

This invention is a continuation in part of and related to the inventions as disclosed in my applications Ser. Nos. 482,628; 612,650; 613,080; 613,081; 613,150, and 613,151. The prior application shows details of operation procedure and apparatus and products of general methods of treating hydrocarbon with light active metals such as sodium. It relates in general to improvements in the art of treating organic chemical compounds and products formed thereby. It pertains particularly to methods of catalytically rearranging component parts of a hydrocarbon or mixture thereof such as petroleum by contacting the same with a molten mass containing an active metal and apparatus usable for such operations and products derived therefrom. This application is further related to Ser. No. 627,171.

Such active metal may be moved to contact the substance to be treated as for example reactable substances in an inert portion or phase comprised of mineral oil. The moving catalytic surface preferably involves a flow or equivalent motion with the molten mass itself whereby new portions are being introduced into the surface. This movement may be of near molecular proportion.

The molten metal preferably includes a metal which is in effect "radio-active". I have found that metals such as commercial potassium, for example, may be used. The temperature is preferably controlled such that the emissions are appreciable. With mixtures such as sodium and potassium or those in admixture with another substance such as fused alkali the emission is apparently of various wave lengths and/or electronic bombardment of various intensities, so composition as well as temperature may be used to control the reaction.

Without committing myself to the exact mechanics of the reaction, I would explain the action as being one which seems to consist of or includes ionization by collision of hydrocarbon particles with or under the influence of the photons, quanta or other agent which is present at the zone of contact between the metal surface and the hydrocarbon. Vapor phase reactions seem to be more active. Pressure may be controlled to influence the reaction.

Temperature appears to raise the energy level in a manner to approach ionization such that the emission, in whatever form it may be, is sufficient to raise one or more electrons of the hydrocarbons to "infinity" thus making it possible for the same to condense or otherwise react. To promote such action I maintain high temperatures and control the contacting surface to insure freshness.

As applied to a sulphur containing oil, the reaction may be controlled to produce condensation to form sulphur compounds of high molecular weight. In some instances especially where hydrogen is available the reaction seems to form hydrogen sulphide gas and very probably a limited amount of free sulphur. Hydrocarbons of low molecular weight may be introduced for similar or other purposes. An electric potential may be applied to the metal in stream, sheet or equivalent form so making for better control of activity and/or greater intensity. Such potential may likewise be used to activate hydroxides, chlorides and other substances, this general method being unusually effective in high vacuum operation and wherein magnetic effects may be effective in influencing the operation. A negatively charged stream with moving gaseous fluid in contact therewith is very active.

If a petroleum product is cracked with the formation of light products of gasoline range and lighter products such as fixed gases the yield of the latter generally represents a loss. I have found that such light products may be passed into contact with molten metal containing substance and a portion thereof caused to condense. This generally involves a reduction in the amount of the less desirable products and so increases the quantity of the more desirable product.

Hydrocarbons containing up to three or four carbon atoms may be condensed with the formation of chain or cyclic compounds containing a methyl or other group, such formation seeming to have desirable properties for use in intercombustion engines. The nature of the molten mass, the temperature, the time of contact and composition of the fluid may be controlled to produce desired results. Unsaturated compounds of low molecular weight are generally more effective than the saturated compounds.

The composition of matter formed by my process in the above described manner may be controlled to yield substantial yield of a gasoline-like product of a boiling range between about 50° F. and 380° F. The product is rendered very stable in addition to the removal of sulphur and/or gum forming substances.

Metallic catalysts have been commonly used for some time and generally in a finely divided form. The contacting surface with such usage is fixed and may collect products which will inhibit operations. It is difficult in most instances to remove solid particles which may be deposited at the contacting surface, small spheres of liquid are in such respects like the solids.

My invention preferably involves the use of a fluid catalyst carrying a metal and in effect molten. The catalyst may be a metal either in its natural liquid phase or in solution or colloidal or similar suspension in a suitable conveying medium. The molten state makes it feasible to maintain catalyzing conditions which are constant or practically so and facilitate removal of reaction products. The conditions are controlled to yield activity sufficient to cause rearrangement and to render good recovery possible or in the other extreme to introduce small amounts in a controlled manner for consumption or without recovery the latter method frequently being the most economical and in this case carrying medium is recharged with appropriate amounts and the medium itself may be active in some respects and to an extent to lower the amount of the catalyst metal required.

Hydrogen readily combines with metals such as sodium and upon contacting the hydride or other combination with a fluid hydrocarbon hydrogen so combined may be caused to react with a portion of said hydrocarbon. By having hydrogen with the metal, hydrogenation may be carried out in connection with or as a supplement to rearrangement. From the fact that methylation may be carried out with methane gas it seems that hydrogen is combined with the metallic portion or combination with carrier setting free an ionized methyl group and that thereafter the hydrogen itself becomes added to a portion of a double bond of the unsaturated substance or elsewhere in the same or other molecule.

Some hydrocarbons such as the high molecular weight portions from petroleum are easily oxidized. In the production of a lubricant it is desirable to first remove or alter all or most of those molecules which are oxidizable. I have found that hydrogen may be introduced by the process to remove or alter some but that oxidation may be resorted to if the others are to become "saturated" or inert with respect to subsequent treatment with oxygen and the two methods may be used in combination. Air or other oxygen containing gas may be contacted with such hydrocarbon an oxide of nitrogen often facilitating the reaction. This apparently forms saturated compounds with the prevention of subsequent oxidizable properties. Whether this is due to control of the aldehyde or ketone stages or otherwise is not known. In some instances it is probable that hydroxyl groups are converted to the carboxyl and that the compounds thereof are removed as by salt formation or by decomposition with elimination of carbon dioxide.

The usual method of refining hydrocarbons such as oil from petroleum and coal tar involves venting of natural gas, stripping of gasoline and cracking to yield more gasoline the residue from which is distilled to yield kerosene, gas oil and other commercial fractions. The residue may be used for fuel oil or run down to coke to yield lubricating stock. By such procedure a number of distillations are generally resorted to and various fractions are separately treated as with sulphuric acid, caustic and lead solutions and as with an adsorptive agent as in contact filtration.

My invention involves a simple method of volatilizing petroleum, rearranging and treating the same in substantially uniflow manner maintaining vaporous form throughout treatment and then selectively condensing fractions which are so formed suitably for use. After any portion has been condensed a treatment may be imposed before further portions are condensed. In such manner cost of treating is less and stability and high purity insured. The treating may be in multiple with variance as to method in successive steps and in a manner herein described and in combination with known methods and those disclosed in other applications now pending such as those involving electrical discharge as at low pressure.

The free carbon-like substances often associated with resinous portions may be finally separated as by "drying" on a continuously moving electrically heated metallic belt or other means by which the dried product may be flaked, scraped or broken off. The thin spread of heavy oil on such means insures rapid drying and desirable form of the now volatile portion the exact procedure being of secondary importance to the objective of producing vapors which may pass through the treatment indicated herein or its equivalent.

When petroleum is treated with an alkali metal for example at a temperature of about 290° C. and under an absolute pressure of about 100 mm. structures of from about 24 to 40 carbon atoms may be rearranged and to yield structures with from about 10 to 20 carbon atoms and with proper control up to about 30 carbon atoms and wherein it appears that some of the chain types are rearranged into cyclic compounds. In such rearrangements free carbon is often evolved in appreciable amounts.

I have found that the heavier fractions may be volatilized more readily if they are mixed with lighter portions, so forming an oil of wide boiling range. My invention thus includes treatment of light hydrocarbons in admixture with those hydrocarbons of lubricating range as by contacting with sodium in sodium and potassium hydroxides as a carrier or control. This method prevents detrimental rearrangement of heavy oil and permits of reaction between some of the lights and the heavier as by a grease chemical addition, the explanation of this and other reactions being given in explanation of what seems to take place but I do not limit myself to such precise chemical procedure but to the results involved which in this case are indicative of such addition. Natural or fixed gases may be passed through indicated steps of treatment and with gasoline range and heavier hydrocarbons.

Condensation of gases may so be effected by passing the same into contact with a metal containing catalyst, such operation if carried out under suitable conditions such as temperatures between about 250° C. and 400° C. and pressures between about ten and fifty atmospheres, yielding combination therebetween. Pressure may be attained as from a lower state by compression of the vapors and wherein a rotor of a centrifugal or turbo compressor may be electrically charged to cause or influence reaction and/or the centrifugal effect utilized for separation or action.

The treating step may be brought about by passing the gaseous fluid through towers in which is circulated the molten mass. Successive towers may operate with different composition of melt for example caustic with little or no metal in one and a high concentration of metal in another, each tower contributing to purification and/or rearrangement. A specific control may so be worked out for each hydrocarbon treated to produce the results desired. Gases, oxygen, vaporous sodiums, or other fluids may be introduced as required to yield the results desired. Temperature changes may be made as between treatments and portions separated and isolated or returned ahead or after the withdrawal point or otherwise treated as with fluid withdrawn from another point.

I have found that concurrent flow as contracted with countercurrent flow is generally essential with metals such as sodium. Countercurrent flow requires that vapors pass upwardly since the normal flow of the metal is downward and such flow involves splashing and "air lift" effect which is not sufficiently overcome by gravity so that polymerized portions soon plug up a system such products having in but one stage an extremely high adhesion with respect to the walls and other parts of the vessel. An exception may, in some instances, be the case of where the metal stream is especially controlled so as to avoid breaking up or so as to increase the gravity as with alkali hydroxide which is more readily held together and agglomerated.

The metal may be controlled to yield a smooth stream with every changing surface exposure. Thus the discharge nozzles are used to yield a continuous or near continuous stream and to prevent commingling of the metal within the surrounding vapors. Finely divided metal on contact with vapors being treated take on a coating which prevent such particles from agglomerating. My invention prevents the formation of such particles and insures economical recovery and reuse of the metal.

One of the undesirable conditions for treatment is that of bubbling vapors through a mass of liquid. The resulting mass of polymerized substance, particularly such as is obtained with sulphur compounds, thickens and often becomes immobile so plugging up the system. My invention involving a stream or sheet of metal presents like surfaces and continuously carries polymerized substances out of the reaction zone thus insuring proper and definite control not otherwise obtainable. A mass of metal say one two inches deep will remain in proper form but about a minute where bubbling is used and soon thereafter the broken up particles are in such form as to absolutely prevent agglomeration and/or complete separation of the metal from the polymer and/or the production of clean metal for effective reuse.

Another feature of my invention is the elimination of back pressure. The use of a nonbreaking contact such as that of a stream or sheet of metal permits of distillation under the lowest possible pressure and/or maintains a uniformity of conditions throughout the region of contact. By nonbreaking contact I mean contact of the vapor in a manner which will not break up the metal and I wish to distinguish this method from agitation types of contact such as is obtained by mechanical agitators, injectors, bubbler columns and the like. On the other hand it is often desirable to maintain a multiplicity of such a similar form whereby the effect of a nonbreaking contact is had and wherein appreciable capacity is had by virtue of multiplicity.

Advantage may be taken of the vapor pressure temperature relationship to form a mixture of vapor of such metal with an inert, or nearly so, vapor such as a straight chain saturated hydrocarbon of from about 10 to 30 carbon atoms. In this and following instances the sodium is not recovered as a free metal. In many instances a sodium salt is obtained which may be dissolved as in water or alcoholic solvent and in some instances acid treated at one time and this may be done in a manner to release the molecular form with hydrogen or a radical in place of the sodium or substituted metal. A chloride may be fused with the sodium containing salt to serve such purpose.

The treatment is carried out under conditions conducive to molecular rearrangement that the yield will be different from the substance to be treated. In this connection I have discovered that at temperatures above about 250° C. the metal is sufficiently active to cause rearrangement of the hydrocarbons such as are contained in petroleum. At somewhat lower temperatures impurities such as sulphur compounds may be removed as by polymerization but with inappreciable rearrangement. The upper limit of the desired range of conditions is about 400° C. at which temperature the vapor pressure of sodium for example is about 1.4 mm. whereas it becomes about 8.6 at 500° C. the latter figure being too high for high vacuum operations as of a few millimeters except by my method wherein evaporation is carried on independently and/or limited amounts of metal are added. An alternative procedure is to deliberately control the operation so that sodium or potassium is under conditions to be substantially vaporized. Thus considering the partial pressures, of an oil in vapor form mixed with sodium, at about 400° C. the gaseous mixture may be in effect for example a partially sodium-saturated oil.

Although the reaction is probably dependent to a considerable extent upon having appreciable amounts of sodium in the vapor phase there is no need to approach saturation a "relative humidity" of about a few percent being satisfactory and the nonbreaking type of contact yields satisfactory proportions making it possible to control the "humidity" irrespective of the temperature and pressure which is to be contrasted with the other methods which tend to produce a saturated condition wherein the metal content cannot be separately controlled. The upper portion of the treating zone may be separately controlled as to temperature to throw out or back some of the metal or an equivalent device used for like purpose.

Concentration of the metal in the vapor phase may be further controlled and operation otherwise facilitated by utilizing a carrying medium for the metal. Such substance may be for example a mixture of sodium and potassium hydroxides and wherein a concentration of a relatively few percent of the metal may be used. The high specific gravity of such a selected medium will render separation feasible and make it possible to use countercurrent flow as is desirable under some conditions. Such hydroxide may contain another substance such as a chloride and a compound of another metal with one unpaired electron such as aluminum and with which the free metals sodium and potassium may be greatly reduced or not used the hydroxides then being a carrier for aluminum, which free metal may be formed therein by electrolysis, the carrying medium being one or more hydroxides. A near eutectic mixture of sodium and potassium hydroxides offers a useful way of so setting free aluminum where small concentrations may be used. The chloride may be used similarly as in chlorides of sodium and/or potassium.

With many oils it is desirable to treat first with a fused hydroxide or chloride (or mixtures of each or of metals) and to subsequently treat with the metal or metals. By this mode of operation my invention often yields greater efficiency as regards consumption of metal and/or conversion or rearrangement such as may be sought.

I am aware that in some instances it has been reported that "anhydrous" caustic has been employed for treating products petroleum. Disclosure of methods apparently use the standard "anhydrous" caustic of commerce. This product invariably contains from about one to ten percent of water which fact is recognized in specifications covering the same. The method of manufacture involves evaporation in the so-called caustic pot, an iron vessel generally direct fired and open to the atmosphere. Even when such apparatus utilizes vacuum for finishing the evaporation the water is never below about one percent. Caustic readily takes up atmospheric moisture wherefore the "anhydrous" caustic previously used does contain appreciable amounts of water.

I have found that when caustic has been properly dehydrated so that at the zone of reaction less than about one percent of water is present, petroleum may be treated with unusual results. Water or the equivalent as substances containing a hydroxy group may be formed during the reaction thus diluting the caustic as regards its effectiveness. My invention is thus to be distinguished from the heretofore disclosed methods which have used the common term "anhydrous" in the sense that the industry has always used the term. Such disclosures have not disclosed actual dehydration to reduce the water content to below about one half or one percent at the reaction zone.

For most treatments it is quite essential that caustic be dehydrated and then used without exposure to the atmosphere. In some instances an advantage may be had by also giving petroleum, or a product thereof, a treatment with ordinary "anhydrous" caustic or caustic containing even more water. In general it is preferable to do so before treatment with dehydrated caustic.

As a salt or hydroxide containing water is concentrated as by evaporation, it gradually approaches the condition of dehydration which term is applied in the art to the condition of being approximately water free in the sense that most of the water has been removed, as compared with the state of absolute dehydration wherein all of the water has been removed except traces of water which may be in definite chemical or physical equilibrium with the conditions involved.

As disclosed in my application Ser. No. 482,267 filed Sept. 16, 1930 and my issued Patents Nos. 1,734,699 and 1,913,145 caustic or other compound may be dehydrated electrically and/or by formation of an alkali metal therein. The process may be used to produce a state of dehydration of compounds of alkali metals, wherein the water content is decreased or entirely removed by electric power. Relatively cheap electricity is thus substituted for more expensive chemical heating or other means as has been used in the past. As an example of this, the moisture content of a commercially and partially dehydrated hydroxide of sodium may be removed by electrolysis of the fused mass thus producing a state of complete dehydration. Furthermore, vacuum may be applied to the operation, to assist in carrying off gaseous products of the electrolysis producing the metal. In case where an excess of a dehydrating agent is required, the electrolysis may be continued past the dehydration point, thus creating an excess of free sodium. In operating a cell continuously for this purpose it is therefore but necessary to discharge both fused hydroxide and metal as contrasted with the usual method of operation whereby sodium alone is discharged in one system, the isolated metal being later added to the hydroxide.

As an alternate method of dehydrating the fused material, it is economical to add to the partially dehydrated compound, a mixture or solution of the compound containing free metal or some derivative thereof as, for example, a solution of sodium or sodamide in fused caustic soda. This method eliminates some of the corrosive and hazardous conditions involved in electrolysis of such compounds when mixed with small amounts of water.

In using alkali metals and compounds thereof for the preparation or treatment of chemicals it has been the usual practice to isolate the metal, solidify the same, pack, store and ship the same. Thereafter the metal would again be made fluid and used. This has involved unusual hazards affecting both life and health and has caused a loss in yield due in part to handling and exposure to the elements.

My invention involves the use of a closed system which greatly reduces the hazard and prevents air and other elements from acting in a deleterious manner. It results in less costs of labor, yield and insurance and greatly improves the safety and the health of the operators.

Another feature of the invention is storage and/or use of the alkali metal or its derivative such as its amide, in relatively dilute solution in a fluid material such as fused alkali compound or a petroleum product or mixture thereof. The compound itself may react or be a catalyst or merely used as a vehicle. This method of using an inert fluid in combination with an alkali compound which is treated with an alkali metal or a derivative such as an amide or other equivalent dehydrating or reacting substance gives excellent results in organic reactions. In effect, a portion of the oil is a diluent and/or carrier for substances to be reacted.

While such a reaction may be carried out by introduction of a hydrocarbon in the form of solid or liquid particles which are then mixed to form a nearly uniform fluid mass, best results seem to be obtained by passing the substance in a vaporous form into contact with the alkaline substance. Since such and similar treatment involves surface reaction, it is quite essential that the bubble-like portions be remixed and again broken up into like portions for subsequent and similar treatment. A multiplicity of changes from mass to bubble-like form is preferred. Since some portions of a complex gaseous fluid are preferably treated under different conditions the fused alkaline substance may vary in composition at successive treatments to give greater efficiency of reaction.

Excellent results may be obtained as by flowing a reacting agent, containing a metal with one unpaired electron, though a tower is in stream from or over tower packing. Thus sodium dissolved or suspended in a mixture of sodium and potassium hydroxide may be flowed with hydrocarbon vapors through a tower or other vessel. The ever fresh surface and moving liquid particles insure proper contact and reaction.

If a gas, such as one containing petroleum vapors, is passed through fused hydroxide and contains organic chemical such as compounds containing groups such as —OH, —COOH and —SH and frequently —SR wherein R is a hydrocarbon radical such as C₂H₅, the groups may be altered and/or removed from the containing gas. The presence of free alkali in solution in such hydroxide or mixture of hydroxides is frequently of great assistance in causing such alteration and/or removal. In some instances such method may be substituted for or supplemented by treatment of an alkali metal in solution in an inert substance such as a heavier boiling oil. While such an oil is inert with respect to the above described reaction, it may itself be reacted on as under such conditions dissociation, ionization or like reaction may take place and in a manner to cause molecular rearrangement of such oil. For example it may be cracked into lighter products. Portions of a gaseous fluid reacting with the fused compound may be subsequently separated therefrom for use or discard.

When a free alkali metal is present, especially when in a nascent state, the reaction may be carried out at a lower temperature as for example between about 200° C. and 350° C. In the absence of free alkali or when the concentrations are low, a temperature somewhat in excess of about 400° C. appears desirable for the process. It appears that, in the upper temperature range, special properties of the alkali or compound are available for reaction purposes; this is probably due to electronic discharge from portions thereof. An applied current may influence such discharge.

In applying my process commercially, as to the treatment of petroleum distillate, advantage may be taken of the fact that the hydrocarbon to be treated is at one or more stages already in the vapor form. For example a hydrocarbon mixture such as the vaporous fluid from a cracking process is frequently at about 400° C. and sometimes considerably in excess thereof.

Hydrocarbon in this form may be passed through my process with little expenditure for heat as would otherwise be required for evaporation. A multiplicity of treating zones may be used and held at gradient temperatures and heat caused to pass from the vapors into the fused alkaline compound held in one or more stages. Heat may be applied to some of the treating stages to overcome radiation or for other purposes.

A gas such as hydrogen or methane may be caused to enter the reaction and so cause hydrogenation and/or formation of additional products. To this end such gas may be caused to become mixed with a vapor of a hydrocarbon if not already associated therewith. This form of reaction is made more positive by fairly high intensity of electrical discharge preferably at or near the zone of contact.

Components left therein which would be destroyed if the hydroxide were put through a regular recovery system may be recovered. Large savings may also be made in those processes where, after fusion, the alkali content is wasted as by neutralization with an acid.

After the fusion has been completed, the organic salt may in some cases be recovered by concentration or nearly complete separation from the alkali compound by filtering. If a fluid material such as a mineral oil is added it may facilitate this separation. In this case the alkali compound or part thereof may be recovered and received without such a large expense of diluting as is ordinarily resorted to.

The operation may be such that the contacting mineral oil will be under pressure thus giving higher concentration, greater solubility and/or other factors conducive to desired reaction. In such operation the pressure may be released before or after passing into the condenser or heat interchanger. The pressure may be extended through the absorption system to facilitate recovery of light distillates from fixed gases or other condensibles. A reduced pressure has been found desirable as for some lubricating oils.

By maintaining a closed system as between points of formation and points of use of the active metal the extreme hazards of isolation are eliminated. This useful feature with that of noncomplete conversion of raw material is disclosed in one of the applications above mentioned. Increased labor and chemical efficiency is also realized in addition to a more precise control. Quick return of electrically treated carrier gives further benefits of greater activity and the operation often facilitates separation.

In effect the method involves chemical reaction of an organic substance which is carried by or mixed with inert fluid, a mineral oil or its equivalent this dilutent or carrier acting to dilute the active metallic substance. The dilution renders the action less intense and more easily controlled probably due to quenching action.

This phase of the invention thus involves use of a petroleum product as a vehicle to carry an agent which will cause or promote reaction of an organic chemical. This inert vehicle may be used either in the liquid or in the vapor phase and for dilution of either the agent or the organic chemical or both. As an example, the molten metallic substance may be contained in a vessel and a hydrocarbon mixture containing the chemical compound to be treated bubbled therethrough. Associated with the chemical compound may be the petroleum product such as a mineral oil vapors of which are admixed with vapors of the compound to be treated. As another example, liquid mixture of the mineral oil may be with the molten metallic compound and the latter caused to become finely divided. The organic chemical to be treated may be kept in the liquid or the vapor phase and a condensation product thereof may be produced as an insoluble form to be later separated, to a satisfactory degree, from the liquid phase. Separation may be aided by the dilution and/or reaction promoted thereby.

A chemical such as a sulphide of a hydrocarbon may be formed in the vapor phase with other hydrocarbons which act as a dilutent or carrier with respect to the sulphide. The mixture of vapors may be bubbled through a mass of molten sodium and/or potassium. Sulphur compounds in the condensate from the vapors will be less than those of the entering vapors and "solids" will be collected in the contact zone. Under some conditions the "solids" may be a viscous substance soluble in a mineral oil. Such "solids" generally contain a comparatively large portion of sulphur.

In thus acting as a catalyst, sodium or the sodium and the potassium mixture presents surfaces for contact with the bubbled-through vapors and these surfaces are being reformed and kept "fresh". The temperature is preferably maintained at between about 250° C. and 400° C. that the desired effects may be had, lower temperatures not being appreciably effective in desired rearrangement.

The process may be carried out in the main in the schematic arrangement as illustrated. Oil is introduced as by means of inlet 1 into a pipe still 2 and discharged therefrom into chamber 3 where vapors may be separated. The liquid may be in part returned as by a pump not shown at some point in line 8 and in part passed through 9 to a belt flaker for drying the nonvolatiles which belt may be built into chamber 3.

Vapors pass through line 4 to a mixing or reacting chamber 5 into which a gas containing oxygen for example may be passed as by means of line 6. Catalytic packing such as metallic oxide or adsorptive material 7 may be contained within vessel 5 and separated material withdrawn as at 10. The vapors may pass through 11 to tower 12 with inlet 13 for molten agent. Fixed or natural gases, hydrogen or other substance may be introduced by means of 14 or 15 and caused to react with the vapors or influence reaction thereof. Connection 15 may also be used as for introducing gaseous fluid from other source.

Molten agent may be discharged as through 16 to separator 17. It is to be noted that introduction is shown as being beneath the surface of the mass within 17 thus facilitating separation. Outflow of separator 17 may pass to scump 18 as by means of line 23 and then discharged through 19 to distributor 25. Electric heating may be used to keep the parts of the system at appropriate temperature.

Separated material may be withdrawn as at outlet 26 which may also be used at intervals for charging desired substances outlet 27 may be used to empty the vessel or for other purposes.

The cell 20 may be used to treat portions withdrawn from the system as by means of line 2 and returned after treatment as by line 21. In some instances the valve in line 23 may be closed and discharge from 17 passed through 21, 20, 22 and 23 to pump scump 18. With pure metal such as sodium, line 11 would enter tower 12 at the top and the vapor outlet 28 would be at the bottom of tower 13. With heavier molten agent such as caustic the countercurrent flow may be used. Chamber 29 may be used for treatment purposes as was 5 and is shown as provided with inlet 30 and outlets 31 and 32.

The tower 33 is illustrated as being provided with nozzle 34 of design to give a nonbreaking flow and inlets 35 and 36 similar to 14 and 15 of tower 12. Outlets 37 and 38 are used for molten agent with associated condensed portion or impurities or produced matter as free carbon and vapors respectively. Condensers 39 and 40 are part of a series used for selectively taking out fractions for different purposes. Separator 42, outlets 43, 44, 45, and 46 are used as indicated, the latter connecting as with other condensers to pressure control means.

Lines 47 and 48 circulate the molten agent which in this system is of different composition from that working with tower 12. One may be a hydroxide-metal system and the other a chloride-metal system. Lines 49, 50, and 51 connect separator 52, scump 53 and cell or converter 54. The connection 55 may be used as required for the oil and agent used, and pump 56 is driven by shaft 57 causing the desired flow. When an electrical potential is to be applied to the molten stream appropriate provisions are necessary. Thus, for example, insulating means and a source of appropriate and high potential of say one or a few thousand volts may be utilized. This is illustrated schematically for reaction zone 12. Shell 58 is insulated from the rest of the system as by insulating flanges 59, 60, and 61. A high potential conductor is represented by wire 62, the other leg of the circuit being grounded. The space such as 63 between flanges 59 is filled with insulating material which may be protected by appropriate aprons and other parts not shown.

Heavier oil withdrawn from the system is suitable for lubricant. The ordinary simple condenser may be replaced by special apparatus to insure proper selection. Such oil may be treated as for wax removal by chilling and filtration. Lighter fractions may be used for other purposes and withdrawn immediately after becoming stable in association with other fractions so permitting of interaction of the parts not allowable by other systems and with greater simplicity characteristics of the fractions so produced by such operation as is herein described are subject of other applications. The improvements in yield of the more valuable fractions and betterment of quality differ with each hydrocarbon treated wherefore specific examples would probably not hold for any other case and might not be reproducible because of the unlikelihood of the possibility of a second lot of like charging "stock".

The purification may be carried to the point of production of an oil with little or no color. The steps and method as described may be used in combination with liquid phase treatment of the hydrocarbon before distillation or controlled amounts of the active agent may be introduced into the heating (for cracking or otherwise) zone. When applying alkali metal or the like to oil in the liquid phase it is highly desirable and also quite essential that the metal containing surface be kept substantially free from deposited resinous or tarry matter and metal as by using positive and definite scraping and applying heat to walls other than those on the bottom beneath the liquid and in some manner equivalent to that of copending applications. The metal applied in the liquid phase treatment may be that previously used for treating oil in either the liquid phase or the vapor phase and may be in association with adsorptive carbon-like matter desired by applying alkali metal to oil. I have found that the so rendered condition is unusually valuable for direct production of desired portions and with simplicity and economy. French Patents Nos. 755,875 and 756,203 show features of certain phases of my invention and indicate general operating procedure and results.

I do not limit my claims to the exact procedure as described but intend to cover other equivalent methods with substances with one unpaired electron or the same in combination with an element or group with a deficiency of one electron in its valence shell. Other metals with one unpaired electron such as aluminum may be used.

I claim:

1. In refining heavy petroleum by means of active free sodium, the process which comprises forming vapors of the petroleum under vacuum and flowing the vapors substantially vertically through one reaction zone, circulating through the reaction zone a fused mass containing alkali metal and substantially continuously withdrawing the metal from the reaction zone and flowing it through a separation zone whereat the metal is separated from organic impurities accumulated by and withdrawn with the metal flowing from the reaction zone, adding freshly formed metal to the fused mass in circulation to give it high activity, flowing vapors which have been so purified in the first reaction zone to a second reaction zone whereat a molten mass containing alkali metal is similarly continuously circulated in practically unbroken stream form and while the portions of metal which are recirculated through the second reaction zone are being purified by separation from accumulated impurities obtained by the metal in its action on the vapors in the second reaction zone, maintaining the temperatures within the two reaction zones different each being between about 200° C. and about 400° C. that the vapors will be treated at different temperatures in the two reaction zones, controlling the contact of vapors in each of the zones so that the time therein will be within about a minute or so, and quickly flowing the so treated vapors to a fractionating system and forming a multiplicity of liquid fractions differing in boiling range.

2. In refining heavy oil like that of petroleum of lubricating range by simultaneously removing impurities from the oil and promoting desirable molecular rearrangement of a portion thereof to improve viscosity index, the steps which comprise evaporating the oil under substantial vacuum, flowing the vapors of the oil through a reaction chamber in a generally downward direction, maintaining the temperature of the contents of the chamber at between about 250° C. and about 400° C., flowing a molten mass containing substantial amounts of free fresh alkali metal downwardly through the reaction chamber in a substantially unbroken stream in a manner to avoid appreciable dispersion of the metal and to promote contact between the continuously changing surface of the stream and the vapors, controlling the flow of the vapors so that the time of treatment thereof will be about several minutes or less and avoiding appreciable pressure change so rearranging oil of the vapors molecularly and altering sulphur impurities of the oil and forming a resinous product therefrom and collecting said product on the molten mass, flowing the molten mass and impurities collected by the mass quickly out of the reaction chamber, separating impurities from the molten mass and returning purified and recovered metal to the reaction chamber in association with freshly-formed-by-electrolysis metal and in circulatory manner.

3. The process which comprises treating liquid oil like petroleum with alkali metal at between about 200° C. and 400° C. while preventing accumulation of formed resinous or tarry matter on the bottom of the containing vessel, forming vapors from said liquid under reduced pressure and rapidly flowing them through a reaction zone held at between about 250° C. and 400° C., circulating a molten mass containing free and freshly formed alkali metal through the reaction zone in stream form while avoiding substantial dispersion of the molten mass and through a zone of separation of formed resinous or tarry altered impurities of the oil designed to remove portions of altered impurities from the molten mass and a zone of addition of fresh metal released by electrolysis of a decomposable alkali compound, preventing appreciable accumulation of liquid matter within the reaction zone, and so discharging altered impurities from the reaction zone about as formed, and thus simultaneously removing impurities from the oil and rearranging the oil molecularly to form an improved oil by coaction of liquid and vaporous treatments.

4. In combination with the process of claim 3, the added step of flowing the vapors through a second similar reaction zone of a different temperature from the first whereat a molten mass containing alkali metal of different concentration is similarly applied to effect further improvement of the oil.

5. In producing improved oil of lubricating range, the process which comprises forming vapors of the oil under substantial vacuum and passing them through a reaction zone under similar pressure while circulating a molten mass containing metal such as sodium through the zone to contact and desirably treat the oil therein, maintaining the temperature of treatment in the zone at between about 250° C. and about 400° C., treating the circulated mass externally to the reaction zone to remove portions of altered impurities extracted in and carried away from the reaction zone, and practically continuously flowing portions of the circulated mass through a zone of electrolysis to maintain the treating mass fresh, controlling the time of contact of vapors and metal to yield a short period so as to avoid substantial amounts of cracking ordinarily obtained by holding the vapors at the applied temperature and avoiding substantial dispersion of the mass and maintaining it molten and air-free throughout.

6. In refining petroleum to effect purification and improvement thereof by simultaneously removing impurities and promoting molecular rearrangement of portions of the petroleum at between about 250° C. and 400° C., the steps which comprise passing petroleum in vapor form through a reaction zone under an absolute pressure of about 100 mm. and at between about 250° C. and about 400° C., circulating through the reaction zone a molten mass containing an alkali metal in free form converting a portion of the oil of the vapor into hydrocarbons of about half of the original molecular weight and while altering impurities and withdrawing them by circulation of the molten mass through the reaction zone and the zone of purification and maintaining high activity of the mass by adding freshly formed metal thereto as it is circulated and separating portions which have thus been rearranged into substantially lower molecular weight from heavier portions which have not so been reduced in molecular weight.

7. In refining petroleum by application of active metal such as sodium in a fused state, the steps which comprise forming a contact zone of flowing metal held at about 250° C. while avoiding substantial dispersion of the metal therein and continuously removing altered and collected impurities to a point without the contact zone and dropping them thereat and returning the metal to the zone in association with freshly formed metal forming a second and similar zone at about 400° C. and treating vapors of petroleum in the first zone and then in the second zone while maintaining a substantial vacuum thereon and while limiting the time of contact to less than about several minutes to avoid substantial amounts of ordinary cracking and so promoting desirable alteration of the petroleum by promoting rearrangement of one portion in one zone and rearrangement of another portion in the other zone.

8. In refining heavy petroleum by simultaneously increasing the viscosity index and altering and removing impurities therefrom, the process which comprises rapidly forming vapors of the oil under substantial vacuum and flowing them with unchanged pressure through a contact zone, recirculating a molten mass containing appreciable amounts of free and freshly formed alkali metal through the contact zone in a stream flow substantially unbroken while preventing appreciable accumulation of any liquid within the contact zone, concurrently flowing vapors of petroleum through the zone, maintaining the temperature at above 250° C. and below about 400° C., so molecularly rearranging portions of the vapors to increase the viscosity index and removing impurities from the zone with the flowing stream, and practically continuously removing impurities from the flowing stream at a distinct separation zone so that the molten mass being returned to the reaction zone will be relatively fresh and of greater purity as regards the flowing stream thereof discharged from the contact zone, introducing alkali metal newly formed by electrolysis into the circulated stream practically continuously, and controlling the flow of oil vapors so that the time of contact with metal is about several minutes or less.

JUSTIN F. WAIT.